Patented Sept. 22, 1931

1,824,609

UNITED STATES PATENT OFFICE

WILHELM LOMMEL, OF WIESDORF-ON-THE-RHINE, THEODOR GOOST, OF LEVERKUSEN-ON-THE-RHINE, AND HERMANN FRIEDRICH, OF WIESDORF-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

ACCELERATOR FOR CAOUTCHOUC

No Drawing. Application filed December 15, 1927, Serial No. 240,331, and in Germany November 8, 1927.

The present invention concerns a process for the manufacture of vulcanized natural rubber or synthetic rubber-like masses, which vulcanizates will be designated hereinafter as "vulcanized rubber compounds", which consists in effecting the vulcanization in the presence of compounds of the following type:

in which $R_1$ signifies an alicyclic residue (see Bernthsen, Lehrbuch der organischen Chemie XVI Aufl. (1924) page 366), especially a cyclohexyl residue, which is connected with nitrogen directly or by means of one or more carbon atoms and $R_2$ a hydrocarbon residue such as an alicyclic group, which is connected directly or indirectly with N, or alkyl and aralkyl with a straight or branched chain or aryl, which themselves may be linked up with $R_1$ so as to form a ring configuration. In order to illustrate our invention we give the formulas of some compounds containing the typical group

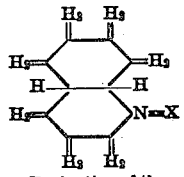
Derivative of the decahydroquinoline

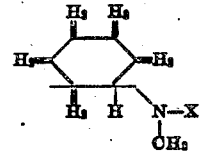
Derivative of the cyclohexylmethylamine

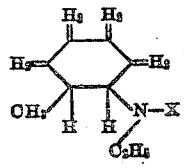
Derivative of the ethyl-hexahydro-o-toluidine

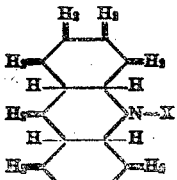
Derivative of the perhydroacridine

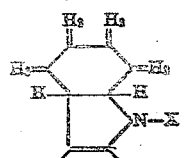
Derivative of the hexahydrocarbazol

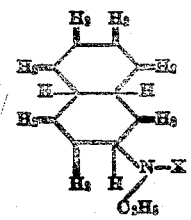
Derivative of the ethyl-decahydro-β-naphthylamine

In our compounds X represents any desired monovalent residue such as:—hydrogen itself or in combination with an aldehyde or an acid especially a weak acid such as carbonic acid, hydrogen sulfide and the like, the group

or the group

in which Y signifies oxygen or the NR-group, R meaning all groups specified for $R_1$ and $R_2$ and hydrogen.

Other compounds containing the typical group are given in formulas like these:—

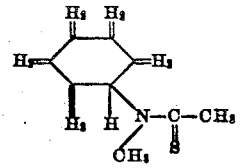

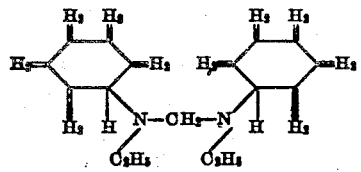

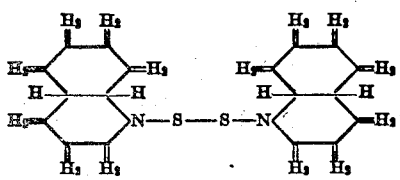

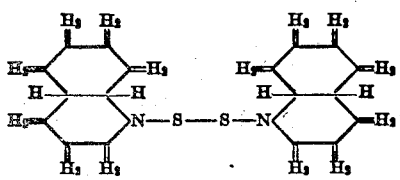

The vulcanization of the rubber compounds may be effected in the usual manner, the compounds in question being used as such or in solutions.

The following examples will illustrate our invention:

*Example 1.*—A mixture of 100 parts of crude rubber, 10 parts of zinc white, 1 part of decahydroquinaldine of the probable formula:

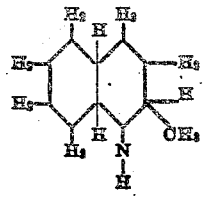

and 5 parts of sulfur is vulcanized for 30 minutes at a pressure of 3 atmospheres. The vulcanized product shows remarkable resistance to tearing.

*Example 2.*—A mixture of 100 parts of crude rubber, 10 parts of zinc white, 2.5 parts of sulfur and 0.5 parts of the zinc salt of the cyclohexylethyldithiocarbamic acid of the probable formula

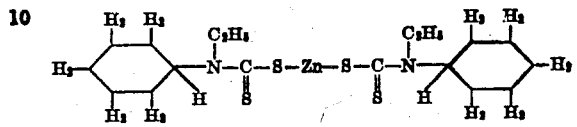

is vulcanized for 20 minutes at a pressure of 2 atmospheres. The vulcanized product has the considerable tenacity of 170 kg. per sq. cm. at an extension of 700%.

*Example 3.*—A 30% benzene solution is prepared for dipping from a mixture of 100 parts of crude rubber, 2.5 parts of sulfur and 2.5 parts of zinc hydroxide. When the dipping of the articles to be vulcanized has been completed, the products are heated to 75° C. for about one hour in a 1½% aqueous solution of the cyclohexylethylamine salt of cyclohexylethyl-dithio-carbamic acid of the probable formula

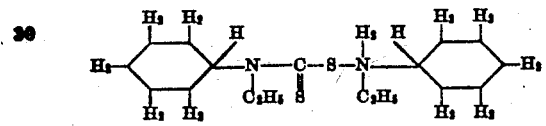

A completely vulcanized product is thus obtained possessing very good mechanical properties. Instead of the cycloheylethylamine salt other salts of the dithiocarbamic acid may be employed such as for instance the sodium salt.

*Example 4.*—A mixture of 100 parts of crude rubber, 3 parts of sulfur, 5 parts of zinc white, 0.65 parts of thiurame disulfide of decahydroquinaldine of the probable formula

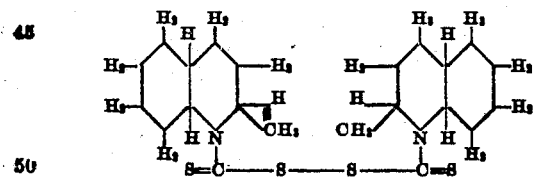

is vulcanized during 15 minutes at a pressure of 3 atmospheres. The resulting product has the considerable tenacity of 170 kg. per sq. cm. at an extension of 760%.

*Example 5.*—A mixture of 100 parts of crude rubber, 3 parts of sulfur, 5 parts of zinc white, 0.55 parts of thiurame monosulfide of cyclohexylethylamine of the probable formula:—

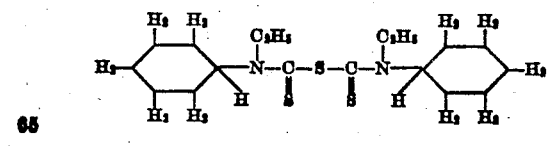

is vulcanized during 15 minutes at a pressure of 2½ atmospheres. The resulting product has the tenacity of 174 kg. per sq. cm. at an extension of 715%.

We claim:—

1. Process for the manufacture of vulcanized rubber compounds which consists in effecting the vulcanization in the presence of a compound of the probable formula:

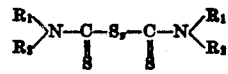

wherein $R_1$ means an alicyclic residue, $y$ means one of the numbers 1 or 2 and $R_2$ stands for a hydrocarbon residue, which may be linked up with $R_1$ to form a ring configuration.

2. Process for the manufacture of vulcanized rubber compounds which consists in effecting the vulcanization in the presence of a compound of the probable formula:

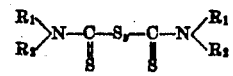

wherein $R_1$ means an alicyclic residue, $y$ means one of the numbers 1 or 2 and $R_2$ stands for a hydrocarbon residue of the group consisting of alicyclic and alkyl residues, which may be linked up with $R_1$ to form a ring configuration.

3. Process for the manufacture of vulcanized rubber compounds which consists in effecting the vulcanization in the presence of a compound of the probable formula:

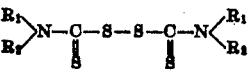

wherein $R_1$ means an alicylic residue and $R_2$ stands for an alkyl residue which may be linked up with $R_1$ to form a ring configuration.

4. Process for the manufacture of vulcanized rubber compounds which consists in effecting the vulcanization in the presence of a compound of the probable formula:

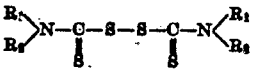

wherein $R_1$ means an alicyclic residue and $R_2$ stands for an alkyl residue containing from 3 to 4 carbon atoms which is linked up with $R_1$ to for a ring configuration.

5. Process for the manufacture of vulcanized rubber compounds which consist in effecting the vulcanization in the presence of a compound of the probable formula:

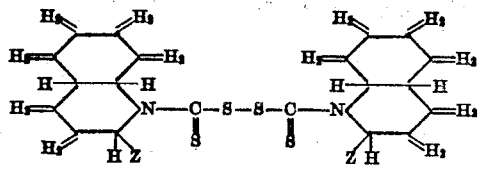

wherein Z stands for hydrogen or methyl.

6. As new products of manufacture, vulcanized rubber compounds obtainable according to claim 1.

7. As new products of manufacture, vulcanized rubber compounds obtainable according to claim 2.

8. As new products of manufacture, vulcanized rubber compounds obtainable according to claim 3.

9. As new products of manufacture, vulcanized rubber compounds obtainable according to claim 4.

10. As new products of manufacture, vulcanized rubber compounds obtainable according to claim 5.

11. Process for the manufacture of vulcanized rubber compounds which consists in effecting the vulcanization in the presence of a compound of the probable formula:

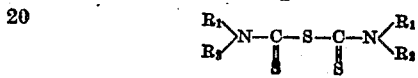

wherein $R_1$ means an alicyclic residue and $R_2$ stands for an alkyl group.

12. Process for the manufacture of vulcanized rubber compounds which consists in effecting the vulcanization in the presence of thiurame monosulfide of cyclohexylethylamine of the probable formula:

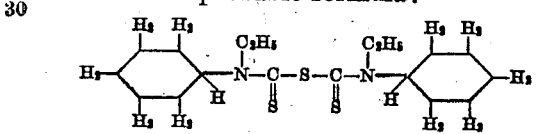

13. As new products of manufacture, vulcanized rubber compounds obtainable according to claim 11.

14. As new products of manufacture, vulcanized rubber compounds obtainable according to claim 12.

In testimony whereof we have hereunto set our hands.

WILHELM LOMMEL.
THEODOR GOOST.
HERMANN FRIEDRICH.